(12) United States Patent
Feldmann et al.

(10) Patent No.: US 11,602,792 B2
(45) Date of Patent: *Mar. 14, 2023

(54) ADDITIVE MANUFACTURING BY SPATIALLY CONTROLLED MATERIAL FUSION

(71) Applicant: VulcanForms Inc., Burlington, MA (US)

(72) Inventors: Martin C. Feldmann, Somerville, MA (US); Anastasios John Hart, Waban, MA (US); Knute Svenson, Washington, DC (US); Andrey Vyatskikh, Pasadena, CA (US)

(73) Assignee: VulcanForms Inc., Burlington, MA (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/157,315

(22) Filed: Jan. 25, 2021

(65) Prior Publication Data

US 2021/0170490 A1 Jun. 10, 2021

Related U.S. Application Data

(62) Division of application No. 15/745,555, filed as application No. PCT/US2016/042860 on Jul. 18, 2016, now Pat. No. 10,919,090.

(Continued)

(51) Int. Cl.
*B22F 10/20* (2021.01)
*B33Y 10/00* (2015.01)
(Continued)

(52) U.S. Cl.
CPC .............. *B22F 10/20* (2021.01); *B22F 10/00* (2021.01); *B29C 64/153* (2017.08);
(Continued)

(58) Field of Classification Search
None
See application file for complete search history.

(56) References Cited

U.S. PATENT DOCUMENTS 7,128,866 B1 10/2006 Henningsen
9,731,450 B2 8/2017 Echigo et al.
(Continued)

FOREIGN PATENT DOCUMENTS

DE 10 2013 011676 A1 1/2015
EP 1 648 686 A1 4/2006
(Continued)

OTHER PUBLICATIONS

Invitation to Pay Additional Fees for International Application No. PCT/US2016/042860, dated Sep. 20, 2016.
(Continued)

*Primary Examiner* — Robert J Grun
(74) *Attorney, Agent, or Firm* — Wolf, Greenfield & Sacks, P.C.

(57) ABSTRACT

Methods and apparatuses for additive manufacturing are described. A method for additive manufacturing may include exposing a layer of material on a build surface to one or more projections of laser energy including at least one line laser having a substantially linear shape. The intensity of the line laser may be modulated so as to cause fusion of the layer of material according to a desired pattern as the one or more projections of laser energy are scanned across the build surface.

25 Claims, 8 Drawing Sheets

Related U.S. Application Data (60) Provisional application No. 62/194,218, filed on Jul. 18, 2015.

(51) Int. Cl.

| | | |
|---|---|---|
| *B33Y 30/00* | (2015.01) | |
| *B29C 64/153* | (2017.01) | |
| *B29C 64/268* | (2017.01) | |
| *B22F 10/00* | (2021.01) | |
| *B23K 26/34* | (2014.01) | |
| *B23K 26/073* | (2006.01) | |
| *B33Y 50/02* | (2015.01) | |
| *B23K 26/06* | (2014.01) | |
| *B29C 64/393* | (2017.01) | |
| *G05B 19/4099* | (2006.01) | |
| *B28B 1/00* | (2006.01) | |
| *B22F 10/30* | (2021.01) | |
| *B22F 10/10* | (2021.01) | |
| *B22F 3/16* | (2006.01) | |

(52) U.S. Cl.
CPC ............ *B29C 64/268* (2017.08); *B33Y 10/00* (2014.12); *B33Y 30/00* (2014.12); *B22F 3/16* (2013.01); *B22F 10/10* (2021.01); *B22F 10/30* (2021.01); *B22F 2203/11* (2013.01); *B22F 2999/00* (2013.01); *B23K 26/0604* (2013.01); *B23K 26/0738* (2013.01); *B23K 26/34* (2013.01); *B28B 1/001* (2013.01); *B29C 64/393* (2017.08); *B33Y 50/02* (2014.12); *C04B 2235/5288* (2013.01); *C04B 2235/5427* (2013.01); *C04B 2235/5436* (2013.01); *C04B 2235/6021* (2013.01); *C04B 2235/6026* (2013.01); *C04B 2235/665* (2013.01); *G05B 19/4099* (2013.01); *Y02P 10/25* (2015.11)

(56) References Cited

U.S. PATENT DOCUMENTS

| | | |
|---|---|---|
| 9,827,632 B2 | 11/2017 | Eibl et al. |
| 9,956,612 B1 | 5/2018 | Redding et al. |
| 10,919,090 B2 | 2/2021 | Feldmann et al. |
| 2003/0075529 A1 | 4/2003 | Mazumder et al. |
| 2003/0214571 A1 | 11/2003 | Ishikawa et al. |
| 2008/0241392 A1 | 10/2008 | Dimter et al. |
| 2012/0007288 A1 | 1/2012 | Wang et al. |
| 2012/0111146 A1 | 5/2012 | Kawano et al. |
| 2013/0105447 A1 | 5/2013 | Haake |
| 2013/0337191 A1 | 12/2013 | Ramanujan et al. |
| 2014/0263209 A1 | 9/2014 | Burris et al. |
| 2014/0265049 A1 | 9/2014 | Burris et al. |
| 2016/0158889 A1 | 6/2016 | Carter et al. |
| 2017/0021455 A1 | 1/2017 | Dallarosa et al. |
| 2017/0304894 A1 | 10/2017 | Buller |
| 2018/0207722 A1 | 7/2018 | Feldmann et al. |

FOREIGN PATENT DOCUMENTS

| | | |
|---|---|---|
| JP | H08-057967 A | 3/1996 |
| WO | WO 2005/011959 A1 | 2/2005 |
| WO | WO 2013/136096 A1 | 9/2013 |
| WO | WO 2017/085470 A1 | 5/2017 |

OTHER PUBLICATIONS

International Search Report and Written Opinion for International Application No. PCT/US2016/042860, dated Dec. 8, 2016.
International Preliminary Report on Patentability for International Application No. PCT/US2016/042860, dated Feb. 1, 2018.
Extended European Search Report for European Application No. 16828388.5, dated Apr. 4, 2019.
International Search Report and Written Opinion for International Application No. PCT/US2019/024832, dated Jun. 11, 2019.

ADDITIVE MANUFACTURING BY SPATIALLY CONTROLLED MATERIAL FUSION

CROSS-REFERENCE TO RELATED APPLICATIONS

This application is a divisional of U.S. application Ser. No. 15/745,555, filed Jan. 17, 2018, which is a national stage filing under 35 U.S.C. § 371 of International Application PCT/US2016/042860, filed Jul. 18, 2016, which claims priority to U.S. Provisional Application No. 62/194,218, filed Jul. 18, 2015, the entire contents of each of which are incorporated herein by reference.

FIELD

Aspects described herein relate to additive manufacturing.

BACKGROUND

Additive manufacturing by selective laser sintering or melting denotes a process whereby sequential fusion of powder layers is used to create a three-dimensional object. To begin, a thin powder layer is dispensed on a working table (frequently referred to as the 'build platform'), so that at least one layer of powder forms a powder bed. Selected areas of the powder layer are then fused by exposure to a directed energy source, typically a laser beam. The exposure pattern of the laser beam thus forms a cross-section of the three-dimensional object. The part is built through consecutive fusion of so-formed cross-sections that are stacked in the vertical direction, and between the fusion of each layer the build platform is incremented downward and a new layer of powder is deposited onto the build surface. The general process of laser powder-fusion additive manufacturing has become known by several terms including selective laser melting (SLM), selective laser sintering (SLS), and direct metal laser sintering (DMLS); and has been applied to various metals, ceramics, polymers, alloys, and composites.

During SLM, a liquid track of molten material is formed along a scanning trajectory of a laser dot. The maximum diameter of the laser ray that can be used is limited by the desired minimum feature size or detail of the part that is to be build. This interdependence of laser beam spot size and feature resolution also limits the build rate and quality achievable by SLM.

To achieve a higher process rate along with a desired feature resolution, it is therefore necessary to install multiple laser beams or to increase the scan rate of the laser across the build surface. The number of multiple laser beams that can be incorporated in one machine is limited by technical and economic feasibility. The maximum scanning speed is limited by the laser power, the melt-pool stability, and heat transfer.

SUMMARY

In one embodiment, a method for additive manufacturing includes exposing a layer of material to one or more projections of laser energy, wherein at least one of the one or more projections of laser energy is a line projection having a substantially linear shape. The method further comprises fusing at least a portion of the layer of material by exposure of layer of material to the one or more projections of laser energy, and moving the one or more projections of laser energy relative to the layer of material so as to fuse the portion of the layer of material in a desired shape.

In another embodiment, a method for additive manufacturing includes providing a layer of material on a build surface, the layer of material comprising a first material having a first melting temperature and a second material having a second melting temperature greater than the first melting temperature, and exposing the first and second materials to one or more projections of laser energy. At least one of the one or more projections of laser energy is a line projection having a substantially linear shape, and exposure of the first and second materials to the projections of laser energy heats the first and second materials to a temperature greater than the first melting temperature and less than the second melting temperature. The method further comprises fusing at least a portion of the first material by exposure of first and second materials to the one or more projections of laser energy.

In yet another embodiment, an apparatus for additive manufacturing includes a build surface, a material depositing system configured to deposit a layer of material onto the build surface, and one or more sources of laser energy configured to expose the layer of material to one or more projections of laser energy. Exposure of the layer of material to the one or more projections of laser energy fuses at least a portion of the layer of material, and at least one of the one or more sources of laser energy is configured to form a line projection having a substantially linear shape.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The spatial and temporal distribution of laser energy onto the powder bed during additive manufacturing by selective laser melting (SLM) is critical to appropriate control of the process. The means by which the energy distribution can be controlled critically influences attributes of interest including the accuracy and achievable smallest feature size of the formed geometry, the microstructure and density of the part, and the productivity of the process which is directly related to the build rate. The laser energy delivery to the powder-bed can be described by attributes including the laser wavelength, the laser power, the intensity profile, the spatial distribution of the laser projection (e.g., the beam profile including the nominal spot size), the laser pulse shape, scanning speed and the scanning pattern.

However, as described above, prior art laser powder-bed additive manufacturing systems, typically SLM machines, utilize only one or more laser sources having a substantially round beam shape (herein referred to as a 'dot' beam). The spatial distribution of the delivered energy can be modified by 'shaping' the intensity profile of the laser beam, for example, to have a 'Gaussian' or 'top hat' profile. State-of-the-art SLM machines have beam diameters ranging typically within the range of 20-200 micrometers.

However, the highly localized nature of such a beam profile limits the rate at which a part can be produced by the SLM method. Increasing the process build rate by increasing the laser scanning speed demands higher laser power. The resulting melt pool of a fast scanning beam, having sufficient power to form a molten track, elongates compared to a slow scanning beam. It has been shown that the instability of a melt pool with a high length-to-width ratio causes undesired defects on the build surface, which form because the molten track breaks into segments each having a greater surface energy than the substantially cylindrical track. Mechanisms of such defects include (i) instabilities caused by the high thermal gradient between the melt and the surrounding powder (ii) liquid track shrinkage during cooling and (iii) break-up of the melted track due to the rapid timescale of capillary flow relative to the timescale of solidification, along with the low viscosity of the liquid metal. Faster laser scan speeds with sufficient energy density lead to longer melt pools, therefore, the morphology of a melt pool that can solidify without balling sets an upper limit for the SLM laser scan speed at which a continuous solidified track is formed.

Moreover, the rate of SLM is governed by the rate at which the incident laser energy causes melting of the powder material on the build surface. This rate may be increased by increasing the laser power, and consequentially this may permit a faster scan rate. However, there also exists a temperature gradient downward from the build surface (i.e., whereupon the laser is incident), which must consequently be greater if a higher power density is delivered in order to increase the build rate. The requirement to achieve melting of the powder at a specified distance beneath the build surface, where this distance defines the approximate layer thickness, also causes more heat to be lost due to evaporation of the molten material from the build surface. This evaporation, along with disruptions to the melt pool shape due to the velocity of the vapor, leads to reduced energetic efficiency and lower surface quality.

The inventors have discovered an additive manufacturing process that overcomes these limitations to achieving simultaneously high rate and resolution in selective laser melting. The new process allows for the use of substantially higher laser power and improved control over the distribution of energy delivered to the build surface, thus increasing the process rate but without the necessity of increasing the scanning speed or sacrificing the spatial resolution (i.e., the minimum feature size).

Aspects described herein relate to the production of a part from a powder-bed in a layer-by-layer fashion, through spatially selective fusion of powder layers, by scanning the build surface with a pattern of energy using one or more line-shaped laser sources of energy, herein referred to as line lasers. Depending on the desired outcome, fusion may represent joining of the elements of the build surface (e.g. powder granules, wires, or sheets) within the solid state, or by melting, coalescence, and solidification. This is performed in such a way that material fusion is spatially controlled over the length of the line, yet need not occur over the total or a substantial fraction of the length of the instantaneous projection of the line onto the build surface. According to some aspects described herein, fusion of the powder along a line in general can be controlled to form any suitable/desired pattern of fused regions along the line without needing to independently control multiple dot shaped laser sources, as would be required using existing methods.

A linear source of laser energy, thus a line laser, may be considered to have a length dimension that is at least 10 times greater than its width, at least 100 times greater than its width, or at least 1000 times greater than its width. For example, a line laser used in accordance with one embodiment may have a width ranging from 10-100 micrometers, and a length ranging from 0.1-1 millimeters, 1-10 millimeters, 1-10 centimeters, or as long as 1 meter. In certain embodiments, the length and width may be defined by the respective dimensions at which the intensity reaches $1/e2$ of its maximum intensity. Also, it may be appreciated that a single linear source, as projected on the powder bed, may be achieved by the superposition of more than one linear source with smaller dimensions and or smaller energy densities For example. a superposition of 10 linear sources each with length 1 centimeter may form a single effective linear source of length 10 centimeters or so that the length of the effective linear source is still just 1 centimeter but the energy density is the sum of the 10 linear sources that make up the line as projected on to the powder bed. Such superposition of linear sources may also result in the capability to project a series of parallel lines of laser energy onto the build surface, such that an exemplary amplitude of intensity modulation between parallel lines is also comparable to the width dimension of each individual line. In this manner, a superposition of linear sources may be used to form a two-dimensional array of laser energy.

According to some embodiments, the distribution of average intensity along and/or across a line laser may be varied (also referred to as 'modulated') in essentially any suitable fashion such that the local intensity ranges from zero to a maximum value. A substantially line-shaped laser source or line laser as projected on to the build surface shall therefore herein not only be defined as a pattern of laser energy as projected on to the build surface having a length to width ratio as defined above with uniform distribution of laser energy along and across said line, but also be defined as such if the distribution of laser energy along and across said line is substantially modulated. The energy of said line can be modulated to such an extent that fusion of the material on the build surface (e.g., a powder) does not occur in some areas exposed to the projection, while fusion of the material occurs in some other areas exposed to the projection. In one example of modulation, the intensity may be set to zero in particular regions along the length of the line, and in other regions the intensity may range between zero and the maximum value, with a spatial amplitude of variation proximate to the width dimension of the line. The line laser can therefore be modulated to such an extent that some or all sections of the line with energies high enough to achieve fusion of the powder at a given scanning speed do not have individual aspect ratios that would define these individual sections of the line as lines in and of themselves. However, it should be understood that these individual sections of fusion are still sections of a modulated line and not multiple, individually controlled substantially dot shaped laser sources. It can be appreciated that fusion of any region of the material is determined by the energy transferred by the laser projection onto that region, and the duration of the transfer, along with parameters of the material and the surrounding, such that the process of fusion or lack thereof is controlled by not only the modulated intensity but also the other process parameters described herein.

As a specific case of fusion, simultaneous melting of a plurality of small regions of the build surface, as described above, allows the process to achieve a high spatial resolution of melting, while overcoming the limitations of current methods including instability of elongated melt pools, formation of defects due to balling, and inefficiency due to high temperature gradients that arise when a plurality of dot sources alone are used, along with higher power density and scan speed, to increase the process build rate. In one embodiment, the number of distinct locations (i.e., isolated melt pools at any instant in the process) on the powder bed that can be simultaneously melted notably far exceeds the number of isolated melt pools that can be formed by scanning of a plurality of independently controlled dot sources.

According to one embodiment, spatially controlled material fusion may be achieved by providing at least one line laser source, and modulating the intensity profile along the length of the line, while coordinating this modulation with the motion of the linear profile over the build surface, so as to spatially control the heating, melting, and solidification of the powder layer.

In another embodiment, spatially controlled material fusion may be achieved by scanning at least one line laser source having a substantially uniform intensity profile along the length of the line, the scanning of the line source coordinated with the scanning of at least one substantially round (dot) source. This plurality of sources is scanned over the build surface such that fusion only occurs in locations where there is at least partial overlap of the areas substantially heated by the line and the area substantially heated by the dot source. For example, the line may heat the powder to a temperature substantially above ambient temperature yet below the melting temperature, and then the dot may raise the temperature above the melting temperature. In this case, the average scanning speed of dot may be, yet need not necessarily be, substantially greater than the scanning speed of the line, and the length of the line may be substantially greater than the diameter of the dot.

Yet another embodiment includes the construction of a build surface comprising spatial arrangements of at least two powder materials having different melting temperatures, and providing a spatial distribution of laser energy defined by scanning laser sources including at least one substantially linear source, such that exposure to the laser energy causes one yet not both of the materials to melt at selected areas of the surface. The melting temperatures may be separated by as much as 10 degrees Celsius, as much as 100 degrees Celsius, as much as 1000 degrees Celsius or as much as 4000 degrees Celsius. Both materials may be metallic, both may be ceramic, or one may be metallic and the other may be ceramic. The materials also may be polymeric, semiconducting, or ionic compounds. The melting temperature of the build surface may also be spatially varied by depositing a uniform composition of a first material, such as a metal powder, and then locally depositing a second material that acts to alter the melting temperature of the combination of materials, for example by forming a eutectic composition.

Figure 1:
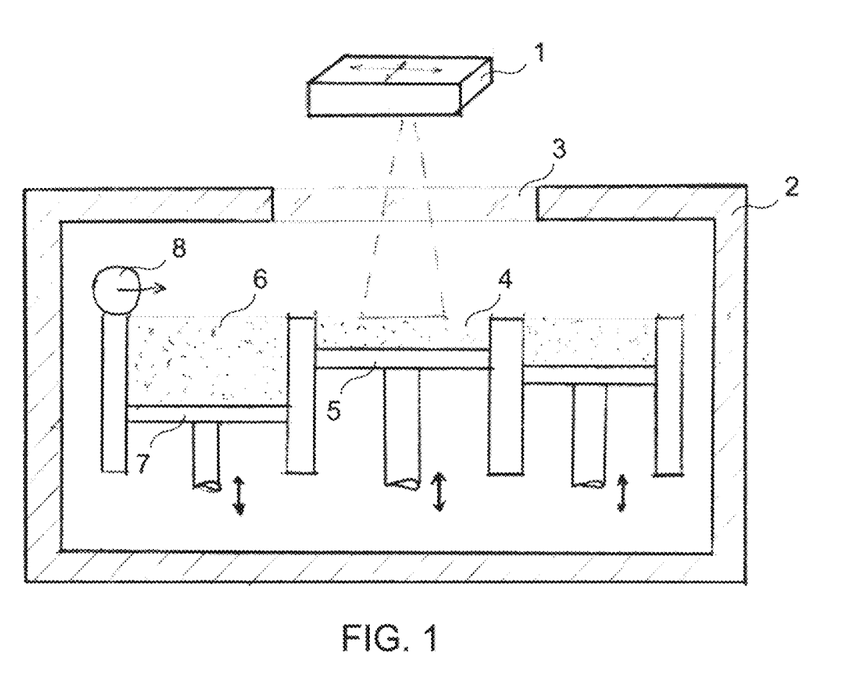
FIG. 1 is a schematic representation of an apparatus for additive manufacturing according to one embodiment.

A schematic representation of an apparatus for additive manufacturing according to an embodiment is shown in FIG. 1. A working table 5 with a powder bed 4 is located inside a chamber 2 with a window 3, allowing for the powder bed to be exposed to a laser source 1. The laser source, or other components positioned in the optical path of the laser source, includes means to change position of the laser beam projection relative to the powder bed such as gantry systems and/or mirror-based systems which may include one or more mirror galvanometers, which may be placed within or outside of the chamber. Means of modulating and/or shaping of the laser energy that intersects with the powder bed, include beam modulation devices and light valves (e.g. Grating Light Valves and Planar Light Valves). Controlled energy delivery from the laser source allows for selective fusion within the powder layer upon localized heating and subsequent cooling. The working table is then lowered, and a new powder layer is distributed on the top of the powder bed. In this embodiment, the powder layer is formed with a recoater system, including mechanism 8 that spreads powder from a vertically actuated powder cartridge 6 in the working table region. Alternative methods of powder layer formation may include deposition of powder by a nozzle mechanism, inkjet deposition, electro-hydrodynamic deposition, or ultrasonic deposition. A three-dimensional part is therefore fabricated (i.e., additively manufactured) as a plurality of consecutively fused cross-sections. It can be appreciated that the cross-sections may be, but need not be, planar.

Figure 2A:
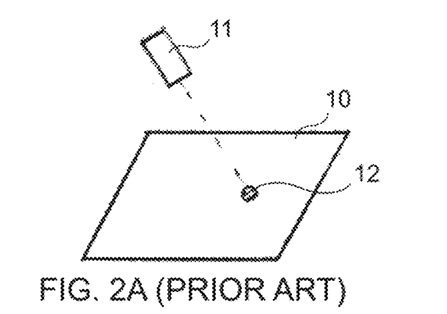
FIG. 2A is a prior art schematic representation of exposure of a layer of powder material to laser source of energy with a single laser source having a substantially 'dot' shape.

FIG. 2A illustrates a prior art method for producing a three-dimensional object from a plurality of fused layers, including a layer of powder 10 exposed by a laser with control means 11. The laser source 11 has a substantially 'dot' shape projection 12 on the layer 10. Selective fusion within the layer is then achieved by scanning the powder layer with a 'dot'-shaped projection along a trajectory confined within a desired cross-section.

Figure 2B:
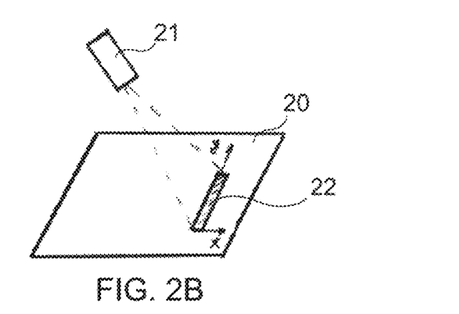
FIG. 2B is a schematic representation of exposure of a layer of powder material to laser source of energy with a single laser source having a substantially 'line' shape as projected on the layer according to one embodiment.
Figure 2C:
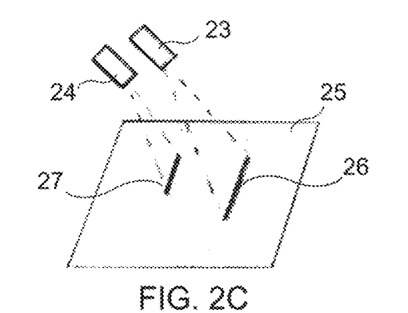
FIGS. 2C-2D are schematic representations of exposure of a layer of powder material to multiple laser source of energy with linear shapes.
Figure 2D:
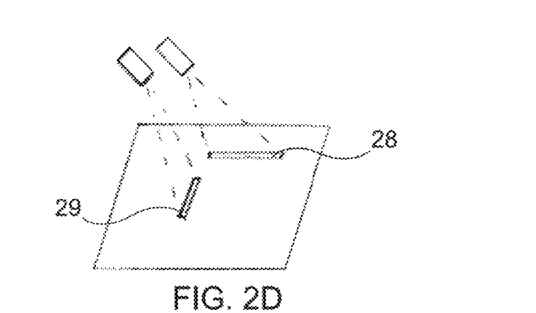

FIG. 2B broadly illustrates an embodiment for additive manufacturing by powder fusion. Powder layer 20 is exposed to a laser source with control means 21 with a laser source having a substantially linear shape 22 as projected on the layer 20. Laser source 21 includes means to modulate the intensity distribution of the line projection 22, for example, light valves such as the grating light valve (GLV) to modulate the intensity along the line or a planar light valve (PLV) to modulate the intensity along and across the line. The exemplary GLV modulator system utilizes the ability to spatially control output light intensity across a projected line using a row of dynamically actuated highly reflective micro-ribbons. The linear distribution of laser intensity is controlled spatially and temporally, in order to direct the local fusion of the powder, or other material form on the build surface such as a fabric or sheet, during scanning of the line across the build surface. Further examples of how the intensity is modulated are provided later. It is apparent that the GLV or PLV modulation are just two means of modulating the intensity of the projected line, and that other means of spatial light modulation may be employed. These may include intersecting the laser with a medium having locally tunable optical transmission, so only a portion of the laser energy, in a desired spatial pattern, is transmitted through the medium and incident upon the build surface.

Figure 3A:
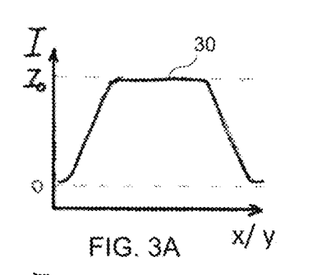
FIG. 3A is a schematic representation of an intensity profile of a laser line as projected on to a build surface according to one embodiment.
Figure 3B:
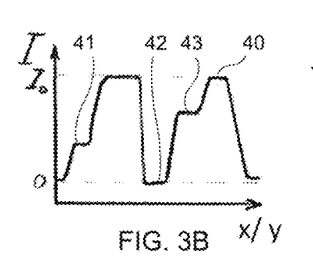
FIG. 3B is a schematic representation of a modulated intensity profile of a laser line as projected on to a build surface according to one embodiment.
Figure 3C:
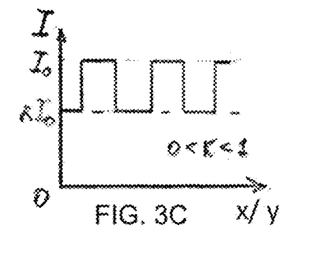
FIG. 3C is a schematic representation of a modulated intensity profile of a laser line as projected on to a build surface according to another embodiment.
Figure 3D:
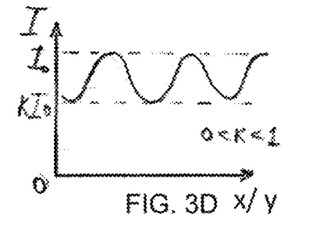
FIG. 3D is a schematic representation of a modulated intensity profile of a laser line as projected on to a build surface according to a further embodiment.
Figure 3E:
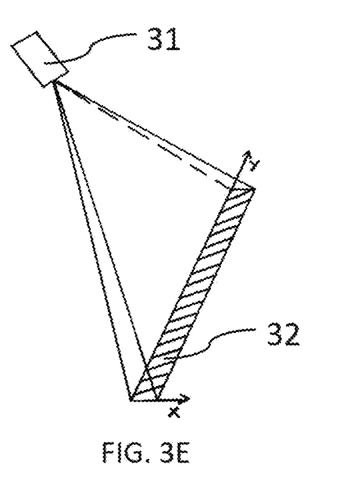
FIG. 3E is a schematic representation of a laser line source projecting a laser line with the x axis representation the direction of the width and the y-axis representing the direction of the length of the line.

FIGS. 3A-3E schematically illustrate that the intensity profile of a projection 32 of a line laser source 31 (FIG. 3E) can be modulated along such line (y-direction). In an alternative embodiment the intensity profile of the line laser source 31 as projected on to the part 32 can be modulated along (y-direction) and across (x-direction) such line. The intensity profile of the line laser source can be changed from mostly uniform at I0 30 (FIG. 3A) to non-uniform (FIG. 3B). Here, parameters of the setup are chosen so that layer exposure at I0 40 causes local fusion of the powder. At the same time, lower intensity regions as those designated with an intensity of 0 or kI0 with k being a number between 0 and 1 (41, 42 and 43), allow for the powder not to be fused at correspondent regions, thus achieving selective fusion of the powder within separated areas of the line projection. Other examples of the intensity profile include rectangular and sinusoidal profiles (FIGS. 3C, D).

Figure 4A:
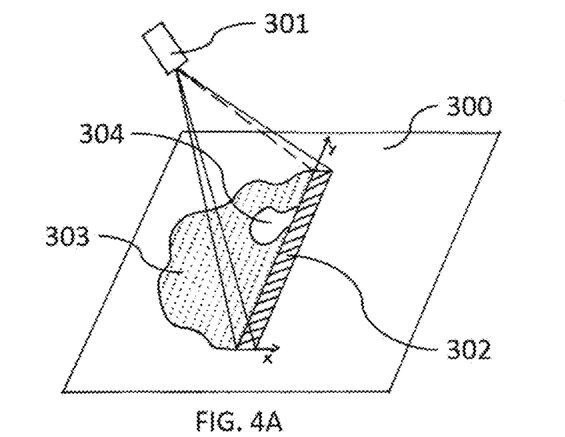
FIG. 4A is a schematic representation of exposure of a layer of powder material to a laser source of energy where the source has a substantially linear shape as projected onto the layer of powder according to one embodiment in which some areas of the layer are selectively fused by the line while others remain unfused.
Figure 4B:
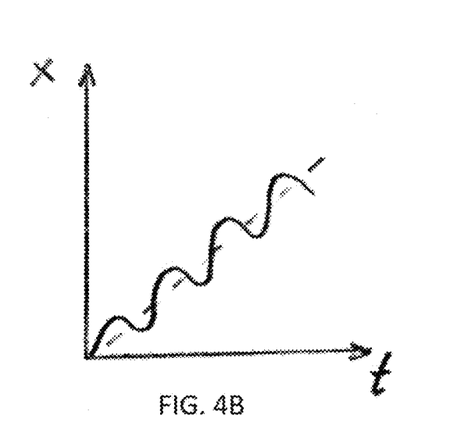
FIG. 4B is a schematic representation of the position of a linear projection versus time according to one embodiment.

FIG. 4A illustrates that coordinated, simultaneous control of intensity profile modulation and line laser scanning allows for the creation of desired spatial and temporal intensity patterns on the build surface. The line laser 301 projects a modulated line 302 on to the build surface 300. The intensity profile of the line projection is thereby modulated in coordination with the scanning of the line in x-direction so that that a desired area 303 is fused. The intensity profile of the line projection can be modulated in such a fashion that not only the outer shape of the fused area 303 is controlled by the process but also so that any desired pattern of fused and unfused areas e.g. 304 can be created within. FIG. 4B illustrates that the scanning of such line as depicted here along the x axis during time t does not need to occur at uniform speed and can even alternate back and forth during the scanning of a layer. This scanning motion may be, for example, the summation of a constant velocity and a sinusoidally varying velocity, and occur in concert with modulation of the intensity along the line such that a plurality of individual melt pools exist due to the projection of the laser, and completion of one or more such scans results in complete fusion of the entire area of the build surface that is desired to be fused.

Figure 5A:
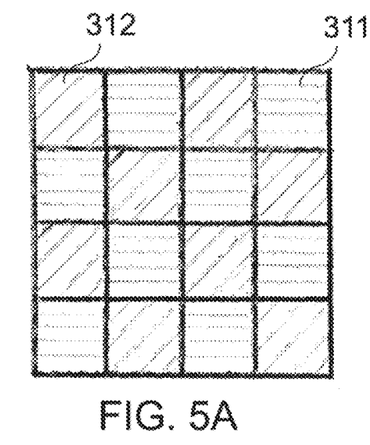
FIG. 5A is a schematic representation of exposure of a powder layer to linearly shaped laser radiation modulated to form a 'checkerboard' pattern, according to one embodiment.
Figure 5B:
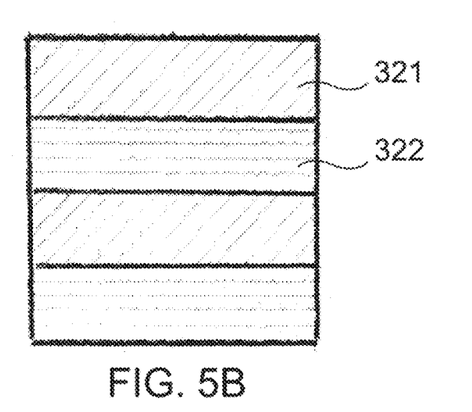
FIG. 5B is a schematic representation of exposure of a powder layer to linearly shaped laser radiation modulated to form a 'zebra' pattern, according to one embodiment.
Figure 5C:
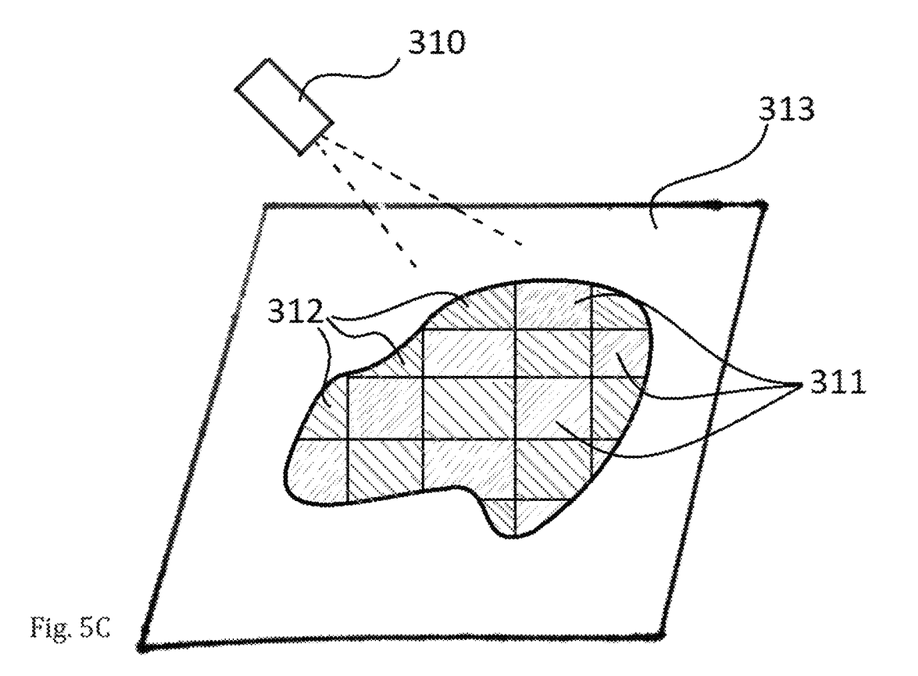
FIG. 5C is a schematic representation of exposure of a powder layer to linearly shape laser radiation in two subsequent stages such in which the fused area after exposure forms a desired shape on the powder layer, according to one embodiment.
Figure 6A:
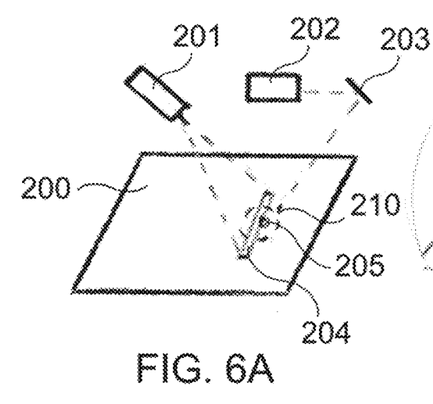
FIG. 6A is a schematic representation of simultaneous exposure of a powder layer with two laser sources of energy with one having a substantially 'line' shape and one having a substantially 'dot' shape as projected on to the layer, according to one embodiment.
Figure 6B:
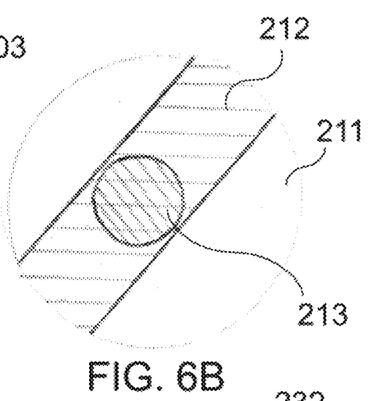
FIG. 6B is a schematic representation of projections from two laser sources, one having a substantially 'line' shape and one having a substantially 'dot' shape with full overlapping of the line and dot projections, according to one embodiment.
Figure 6C:
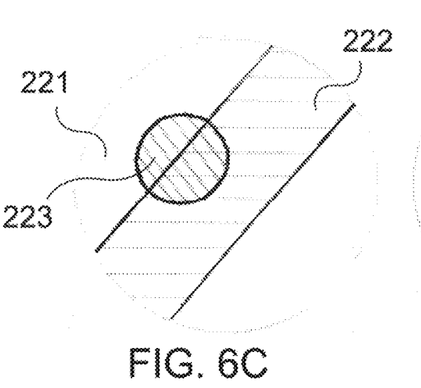
FIG. 6C is a schematic representation of projections from two laser sources, one having a substantially 'line' shape and one having a substantially 'dot' shape with partial overlap of the line and dot projections; according to one embodiment.
Figure 6D:
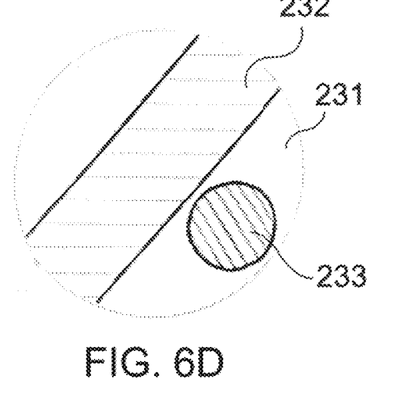
FIG. 6D is a schematic representation of projections from two laser sources, one having a substantially 'line' shape and one having a substantially 'dot' shape where there is no overlap of the line and dot projections, according to one embodiment.

As shown in FIGS. 5A and 5C, a 'checkerboard' pattern may be used to form a plurality of individual melt pools when scanning with a line laser. In this example, the exposure pattern includes at least two stages for each layer. During the first stage, the laser energy is modulated spatially and temporally to induce at fusion only in regions marked as 311 on the build surface 313. During the second stage, at least partial fusion is induced in regions marked as 312, if needed according to the cross-section. Thus, the 'checkerboard' pattern serves as a mask for the exposure area according to the cross-section. The time-varying position of the line projection on the build surface, the width of the projection, and the distribution of intensity along the projection are varied to achieve such an exemplary checkerboard pattern to result in fusion of the material on the build surface having a desired final density and/or microstructure. In this case, the 'checkerboard' is a generic representation of a scan pattern where the relative orientation of locally parallel scan lines is changed within and/or between consecutive cross-sections of the part being additively manufactured.

As another example, delivering energy in a 'zebra' pattern, as shown in FIG. 5B, also allows for control of melt pool morphology. During the first scan fusion is induced in regions marked as 321. Fusion in areas marked as 322 is induced during one or several subsequent scans, which may overlap with regions 321. In contrast to 'dot' laser melting, the width of the melt pool is not set by the size of the laser 'dot', but is directly controlled by the modulation of the intensity along the line laser, and the scan parameters. Other examples include patterns with exposure profiles overlapping for consequent stages, which would allow for more uniform consolidation between areas exposed in different stages. Although a checkerboard and zebra pattern have been described, other patterns that either spatially separate many continuous melt pools such as the zebra pattern (e.g. wave and chevron patterns) or alternate small discontinuous melt pools such as the checkerboard pattern (e.g. herringbone pattern) are possible as well.

It can be appreciated that the effect of multiple stages may be achieved using multiple coordinated linear sources in a shorter amount of time, such that the action of the multiple linear sources is coordinated in the same fashion as the multiple stages described above.

FIGS. 6A-6D illustrate a further embodiments using combinations of 'dot' and 'line' shaped energy sources. One example is using a linear shaped projection of laser energy to heat the powder to a significant fraction of its melting point, and one or more 'dot' shaped sources that cause rapid local melting. In some cases, this may occur upon intersection of the linear projection with the dot projection. Alternatively, this may occur by sequential exposure of an area with the dot and line lasers without intersection of the laser sources but within a short interval of time such that the powder does not substantially cool between the exposures. As schematically depicted in FIGS. 6A-6D, the line shaped laser source 201 and dot shaped laser source 202 are both used to deliver energy to powder bed 200. Parameters of the laser sources may be chosen such that exposing the powder layer only with a line shaped source brings the powder to a substantial fraction of its melting temperature, and melting is spatially controlled by further raising the powder to its melting temperature using a separately controlled laser energy source such as using the dot source. A closer view 210 of the linear projection 204 and dot projection 205 on the powder layer is shown on FIGS. 6B-6D. Full overlapping of the linear projection 212 and the dot projection 213 (FIG. 6B) causes powder fusion within at least a portion of the dot projection, while partial overlapping of the projections 222 and 223 (FIG. 6C) may, for example, cause fusion within at least some of the intersection of the area that is exposed to both the line and dot projections. No fusion takes place within the linear projection 232 if the projections 232 and 233 do not intersect (FIG. 6D); as explained above, in this case fusion can however take place within an area exposed by the dot projection if the dot projection intersects an area of the build surface that was before intersected by the line projection within a sufficient time such that the powder has not substantially cooled from the elevated temperature caused by the line projection. It should be appreciated that the influence of the line and dot sources in the foregoing embodiment may be reversed, for example the dot source may act to raise the temperature yet not cause it to surpass the melting point, and the modulated line source may cause certain areas of the build surface to melt.

Figure 7A:
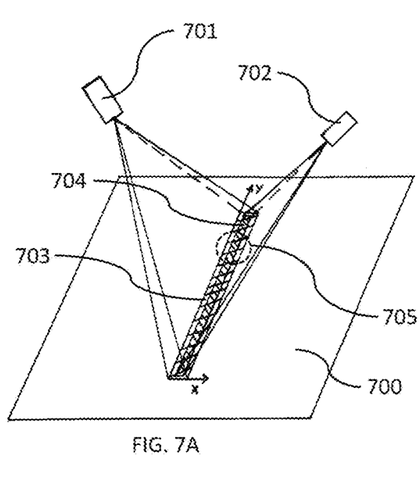
FIG. 7A is a schematic representation of simultaneous exposure of a powder layer with two laser sources of energy with one being a modulated line source and one being a non-modulated line source, according to one embodiment.
Figure 7B:
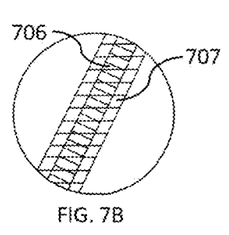
FIG. 7B is a schematic representation of projections from two laser sources, one being a modulated line source and one being a non-modulated line source with full overlap of the modulated line and non-modulated line projection, according to one embodiment.
Figure 7C:
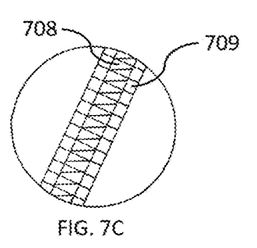
FIG. 7C is a schematic representation of projections from two laser sources, one being a modulated line source and one being a non-modulated line source with full overlap of the modulated line and non-modulated line projections, according to one embodiment.
Figures 7D, 7E:
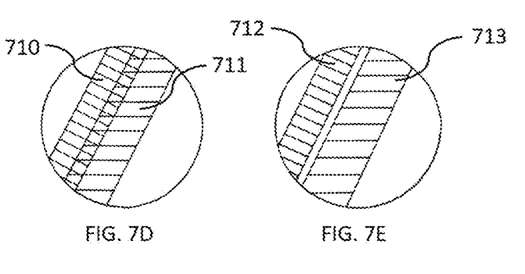
FIG. 7D is a schematic representation of projections from two laser sources, one being a modulated line source and one being a non-modulated line source with partial overlap of the modulated line and non-modulated line projections, according to one embodiment.
FIG. 7E is a schematic representation of projections from two laser sources, one being a modulated line source and one being a non-modulated line source where there is no overlap of the modulated line and non-modulated line projections, according to one embodiment.

FIGS. 7A-7E illustrate a further embodiment for selective powder fusion using combinations of at least one laser line source 702 with a modulated line projection 704 on to the build surface 700 and one laser line source 701 with a non-modulated line projection 703 on to the build surface 700. One example is using the non-modulated linear shaped projection of laser energy to heat the powder to a significant fraction of its melting point, and one or more modulated linear shaped projections that cause local melting. Similar to the embodiment described above in connection with FIGS. 6A-6D, this may occur upon intersection of the non-modulated linear projection with the modulated linear projection, or separately from the non-modulated linear projection yet within a sufficient time such that the powder has not substantially cooled from the elevated temperature. As schematically depicted in FIG. 7A, the non-modulated line shaped laser source 701 and modulated line shaped laser source 702 are both used to deliver energy to powder bed 700. Parameters of the laser sources may be chosen such that exposing the powder layer only with a non-modulated line shaped source brings the powder close to its melting temperature, and melting takes place if additional energy is delivered, such as using the modulated line source. A closer view 705 of the non-modulated linear projection 702 and modulated linear projection 704 on the powder layer is shown on FIGS. 7B-7E.

Full overlapping of the non-modulated linear projection 707 and the modulated linear projection 706 so that the modulated linear projection lies within the non-modulated linear projection (FIG. 7B) causes powder fusion at least within some of the overlapped area. Full overlapping of the non-modulated linear projection 709 and the modulated linear projection 708 so that the non-modulated linear projection lies within the modulated linear projection (FIG. 7C) causes powder fusion within at least some of the overlapped area. Partial overlapping of the projections 710 and 711 (FIG. 7D) may, for example, cause fusion within at least some of their intersection. No fusion takes place within the non-modulated linear projection 713 if the projections 713 and 712 do not intersect (FIG. 7E); as explained above, in this case fusion can however take place within the modulated linear projection 712 if the modulated linear projection intersects an area of the build surface that was before intersected by the not modulated linear projection within a sufficient time such that the powder has not substantially cooled from the elevated temperature caused by the not modulated linear projection.

It can be appreciated that a non-modulated line projection on to the powder that does not intersect with a modulated line or a dot can also be used for heat treatment purposes other than fusion, for example heating the build surface to an elevated temperature so as to relieve residual stress or control its microstructure, after the layer is fused yet before application of the next layer of unfused material.

Figure 8:
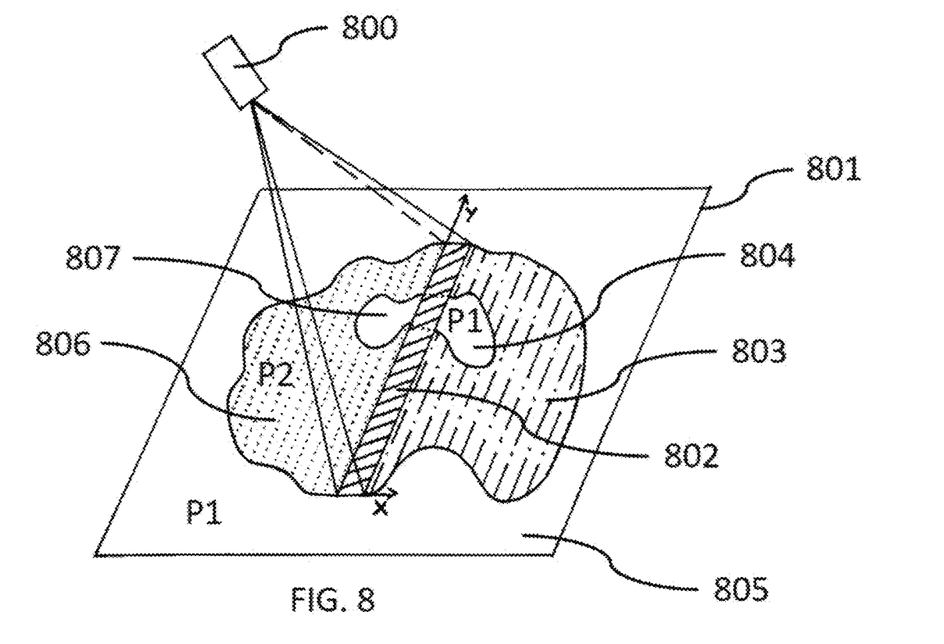
FIG. 8 is a schematic representation of exposure of a layer constructed of two different powder materials by a laser source of energy where the source has a substantially linear shape as projected onto the layer of powder, according to one embodiment.

FIG. 8 illustrates a further embodiment that includes the construction of a build surface 801 comprising spatial arrangements of at least two materials, such as powders, having different melting temperatures. The so constructed build surface with areas comprised of powder material P1 804, 805, 807 and areas comprised of powder material P2 803, 806 is then scanned with at least one line laser source 800 with a linear projection on to the build surface, 802. The exposure to the laser energy source at a given power and scanning speed causes one yet not both of the powder materials to fuse. In FIG. 8 the line scans the build surface in the positive x direction. The build surface on the left side of the linear projection has already been exposed to the laser including areas 806 and 807, yet only area 806 comprised of powder material P2 was fused while area 807, comprised of powder material P1 was not fused due to the exposure. The part of the build surface to the right of the linear projection including areas 803 and 804 has not been exposed to the laser yet and is thusly not fused at any point. Once this area is exposed to the laser, again only area 803 comprised of powder material P2 will be fused while area 804 comprised of powder material P1 will remain unfused.

Additionally, in some embodiments, one or more sensors may be used to monitor temperature and morphology of build surface, and the information may be used to control beam positions, beam intensity profile, powder bed temperature and other parameters in real time. Means of sensing may include photodiodes or infrared cameras, wave propagation and reflection sensors (e.g., ultrasonic, RF). Information from the sensors, in combination with control algorithms may be used to modulate the spatial and temporal distribution of laser energy. For example, the modulation of energy may be programmed to maintain a desired surface temperature, maintain the temperature within a threshold, fuse the material locally to eliminate voids after the primary fusion step, etc. A feedback control scheme may involve spatial imaging of the temperature of the build surface in the vicinity of the area undergoing fusion (e.g., underneath and around the linear exposure pattern), and control of the position and the intensity parameters of the laser source(s), to establish a desired transient temperature field on the build surface, during the processing of each layer of the part. Further feedback control schemes could be used to monitor and control the height of the fused layer, by measuring the height of the build surface during or after the fusion of each layer, and determining the subsequent scan patterns of the laser sources and/or the amount of material delivered in the next layer. The desired transient temperature field may be, for example, programmed to correspond with the desired cross-section of each layer to be fused, and may be informed by a computational simulation of the build process. In accordance with one embodiment described above, wherein at least one laser source such as a line is used to heat the build surface to an elevated temperature below the melting temperature, and a second laser source such as a dot is used to melt the build surface in a desired spatial pattern, the above mentioned sensing and control means may be used to modulate the intensity and position of the laser sources such that prescribed areas of the build surface remain below and above the melting temperature according to a desired program.

Depending on the particular embodiment, a laser line as projected onto the build surface can be as long as 100 micrometers, as long as 1 mm, as long as 10 mm, as long as 100 mm, or as long as 1 m. The average width of such a line can be as wide as 1 micrometer, as wide as 10 micrometers, as wide as 100 micrometers, as wide as 1 mm, as wide as 10 mm or as wide as 100 mm. The average width of the sections of such line that can be modulated individually (herein also referred to as 'pixels') can be as much as 1 micrometer, as much as 10 micrometers, as much as 100 micrometers, as much as 1 mm, as much as 10 mm or as much as 100 mm while being as long as the maximum width of the line. In a further embodiment where the intensity cannot only be modulated along the length of the line but also across the width of the line, the length of the pixels can be smaller than the maximum width of the line. The pixels can be as long as 1 micrometer, as long as 10 micrometers, as long as 100 micrometers, as long as 1 mm, as long as 10 mm or as long as 100 mm. The total power of such a line as projected onto the build surface can be as much as 1 W, as much as 10 W, as much as 100 W, as much as 1,000 W, as much as 10,000 W, as much as 100,000 W or as much as 1,000,000 W. The scanning speed of such a line relative to the build surface can be as much as 1 mm/s, as much as 10 mm/s, as much as 100 mm/s, as much as 1 m/s, as much as 10 m/s, as much as 100 m/s or as much as 1000 m/s. All types of lasers capable of material processing can be used for the line projections such as but not limited to gas laser (e.g. carbon monoxide and dioxide lasers), chemical lasers (e.g. COIL and AGIL lasers), dye lasers, solid-state lasers especially bulk lasers and fiber lasers (e.g. Nd:YAG, NdCrYAG, Er:YAG), as well as semiconductor lasers (e.g. GaN).

It should be understood that a build surface may have any suitable shape. The average width may be as wide as 10 mm, as wide as 100 mm, as wide as 1 m or as wide as 10 m. The average length may differ from the width and may be as wide as 10 mm, as wide as 100 mm, as wide as 1 m, as wide as 10 m or as wide as 100 m.

Various materials can be applied to the build surface for processing with a laser to form the 3D part, such as metals, ceramics, polymers, alloys, and composites. Metals may herein refer to, but are not limited to stainless steels (e.g. 316L and 17-4), construction steels (e.g. maraging 300), light metals and alloys (titanium, aluminum and aluminum-lithium alloys), superalloys (e.g. nickel base alloys such as Inconel and Hastelloy), hard and refractory metals (e.g. tungsten and molybdenum), precious metals (e.g. gold), heat and electrically conductive metals (e.g., copper and silver). Ceramics may herein refer to, but are not limited to inorganic, non-metallic solids comprised of metallic, metalloid or non-metallic atoms. Examples are carbides, nitrides and borides (e.g. tungsten and titanium carbide, silicon nitride and carbide and boron nitride) as well as oxides such as aluminum oxide, zinc oxide and zirconia. Polymer may herein refer to, but are not limited to photopolymers, thermoplastics and thermosetting polymers.

In case of the material being applied to the build surface as powder, such powder particles can be of various sizes, size (and average size) distributions as well as different geometrical shapes. Powder size (and average size) distributions may range from 1-1000 nanometers, 1-100 micrometers, 10 micrometers to 1 mm. In addition, nanostructures may be added to such powders, i.e., base material is a powder and the second material is nanostructures such as carbon nanotube (CNT's) or nanoparticles, with at least one dimension in the range of 1-100 nm. Yet these nanostructures do not need to differ in material from the base material of the powder, though the nanoparticles may have a suppressed melting/sintering temperature due to their size.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for additive manufacturing, comprising:
exposing a layer of material to one or more projections of laser energy, wherein at least one of the one or more projections of laser energy is a line projection having a substantially linear shape, wherein the line projection is achieved by a superposition of more than one linear source of laser energy, each having a length that is less than a length of the line projection, wherein an intensity modulator associated with the more than one linear sources of laser energy is configured to independently control intensities of particular regions along the length of the line projection;

fusing at least a portion of the layer of material by exposure of the layer of material to the one or more projections of laser energy; and moving the one or more projections of laser energy relative to the layer of material so as to fuse the portion of the layer of material in a desired shape.

2. The method of claim 1, wherein an intensity of the line projection is constant along the length of the line projection.

3. The method of claim 2, further comprising varying at least one of the length and a width of the line projection while moving the one or more projections of laser energy.

4. The method of claim 1, wherein at least one of the one or more projections of laser energy is a dot projection, the method further comprising moving the dot projection relative to the line projection while moving the one or more projections of laser energy relative to the layer of material.

5. The method of claim 1, wherein at least one of the one or more projections of laser energy is a dot projection, wherein exposure of the layer of material to the line projection heats at least a portion of the layer of material to a first temperature below a melting temperature of the layer of material, and exposure of the layer of material to the dot projection heats the portion of the layer of material to a second temperature higher than the melting temperature of the layer of material.

6. The method of claim 1, further comprising modulating an intensity of the line projection along at least one of the length of the line projection and a width of the line projection.

7. The method of claim 1, further comprising providing the layer of material on a build surface, wherein providing the layer of material includes depositing the layer of material with at least of one of a powder spreading system, an inkjet deposition system, an electro-hydrodynamic deposition system, and an extrusion nozzle.

8. The method of claim 1, further comprising measuring at least one property of the layer of material and adjusting at least one of an intensity of the one or more laser projections and the movement of the one or more laser projections based on the at least one measured property.

9. A method for additive manufacturing, comprising:
exposing a layer of material to a first line projection of laser energy to heat at least a portion of the layer of material to a first temperature below the melting temperature of the layer of material, wherein the first line projection is achieved by a superposition of more than one linear source of laser energy, each having a length that is less than a length of the first line projection;
exposing the layer of material to a second line projection of laser energy to heat the portion of the layer of material to a second temperature higher than the melting temperature of the layer of material, wherein the second line projection is achieved by a superposition of more than one linear source of laser energy, each having a length that is less than a length of the second line projection;

fusing at least a portion of the layer of material by exposure of the layer of material to the first and second line projections of laser energy; and moving the first and second line projections of laser energy relative to the layer of material so as to fuse the portion of the layer of material in a desired shape.

10. The method of claim 9, wherein an intensity of the first line projection is constant along the length of the first line projection, and wherein an intensity of the second line projection is constant along the length of the second line projection.

11. The method of claim 10, further comprising varying at least one of the length and a width of the first line projection while moving the first line projection of laser energy, further comprising varying at least one of the length and a width of the second line projection while moving the second line projection of laser energy.

12. The method of claim 9, wherein at least one of the first and second line projections of laser energy is a dot projection, the method further comprising moving the dot projection relative to the other of the first and second line projections while moving the at least one of the first and second line projections of laser energy relative to the layer of material.

13. The method of claim 9, wherein at least one of the first and second line projections of laser energy is a dot projection, wherein exposure of the layer of material to the other of the first and second line projections heats at least a portion of the layer of material to the first temperature below the melting temperature of the layer of material, and exposure of the layer of material to the dot projection heats the portion of the layer of material to the second temperature higher than the melting temperature of the layer of material.

14. The method of claim 9, further comprising modulating an intensity of at least one of the first and second line projections along at least one of the length of the line projection and a width of the line projection.

15. The method of claim 9, further comprising providing the layer of material on a build surface, wherein providing the layer of material includes depositing the layer of material with at least of one of a powder spreading system, an inkjet deposition system, an electro-hydrodynamic deposition system, and an extrusion nozzle.

16. The method of claim 9, further comprising measuring at least one property of the layer of material and adjusting at least one of an intensity of the first and second line projections and the movement of the first and second line projections based on the at least one measured property.

17. The method of claim 9, wherein the first line projection is a non-modulated line projection, and wherein the second line projection is a modulated line projection.

18. A method for additive manufacturing, comprising:
passing one or more projections of laser energy through a chamber enclosing a build surface;
exposing a layer of material to the one or more projections of laser energy, wherein at least one of the one or more projections of laser energy is a line projection having a substantially linear shape, wherein the line projection is achieved by a superposition of more than one linear source of laser energy positioned outside of the chamber, each having a length that is less than a length of the line projection;
fusing at least a portion of the layer of material by exposure of the layer of material to the one or more projections of laser energy; and moving the one or more projections of laser energy relative to the layer of material so as to fuse the portion of the layer of material in a desired shape.

19. The method of claim 18, wherein an intensity of the line projection is constant along the length of the line projection.

20. The method of claim 19, further comprising varying at least one of the length and a width of the line projection while moving the one or more projections of laser energy.

21. The method of claim 18, wherein at least one of the one or more projections of laser energy is a dot projection, the method further comprising moving the dot projection relative to the line projection while moving the one or more projections of laser energy relative to the layer of material.

22. The method of claim 18, wherein at least one of the one or more projections of laser energy is a dot projection, wherein exposure of the layer of material to the line projection heats at least a portion of the layer of material to a first temperature below a melting temperature of the layer of material, and exposure of the layer of material to the dot projection heats the portion of the layer of material to a second temperature higher than the melting temperature of the layer of material.

23. The method of claim 18, further comprising modulating an intensity of the line projection along at least one of the length of the line projection and a width of the line projection.

24. The method of claim 18, further comprising providing the layer of material on a build surface, wherein providing the layer of material includes depositing the layer of material with at least of one of a powder spreading system, an inkjet deposition system, an electro-hydrodynamic deposition system, and an extrusion nozzle.

25. The method of claim 18, further comprising measuring at least one property of the layer of material and adjusting at least one of an intensity of the one or more laser projections and the movement of the one or more laser projections based on the at least one measured property.

* * * * *